United States Patent [19]

Scott et al.

[11] Patent Number: 4,838,310

[45] Date of Patent: Jun. 13, 1989

[54] HYDROELECTRICALLY POWERED, REMOTELY CONTROLLED IRRIGATION SYSTEM

[75] Inventors: George R. Scott, Scottsdale, Ariz.; John C. Gray, Austin, Tex.; Eric M. Scott, Sacremento, Calif.

[73] Assignee: Motorola, Inc., Schaumburg, Ill.

[21] Appl. No.: 174,053

[22] Filed: Mar. 28, 1988

[51] Int. Cl.⁴ ............................................. F16K 31/02
[52] U.S. Cl. ........................... 137/624.14; 251/129.04; 239/66; 239/69
[58] Field of Search .............. 251/129.04; 137/624.14; 239/66, 67, 69, 71, 70

[56] References Cited

U.S. PATENT DOCUMENTS 3,726,477  4/1973  Shapiro ................................. 239/70
3,974,879  8/1976  Nelson, Jr. et al. ........ 251/129.04 X
4,185,650  1/1980  Neves et al. ...................... 239/69 X Primary Examiner—Arnold Rosenthal
Attorney, Agent, or Firm—Thomas G. Berry; Wayne J. Egan

[57] ABSTRACT

An impeller is positioned within the flow of a fluid to be used to irrigate an area. The impeller drives a generator, which operates to charge and sustain a storage battery. The battery powers a receiver having an identification code by which the receiver may be addressed to receive commands, such as, for example, to open or close a valve, thereby providing fluid to irrigate an area. By opening the valve, the fluid flow is increased, and more power is generated and stored in the battery. In this way, power is generated automatically for the receiver, which, in turn, controls the fluid flow for irrigation.

6 Claims, 1 Drawing Sheet

U.S. Patent    Jun. 13, 1989    4,838,310
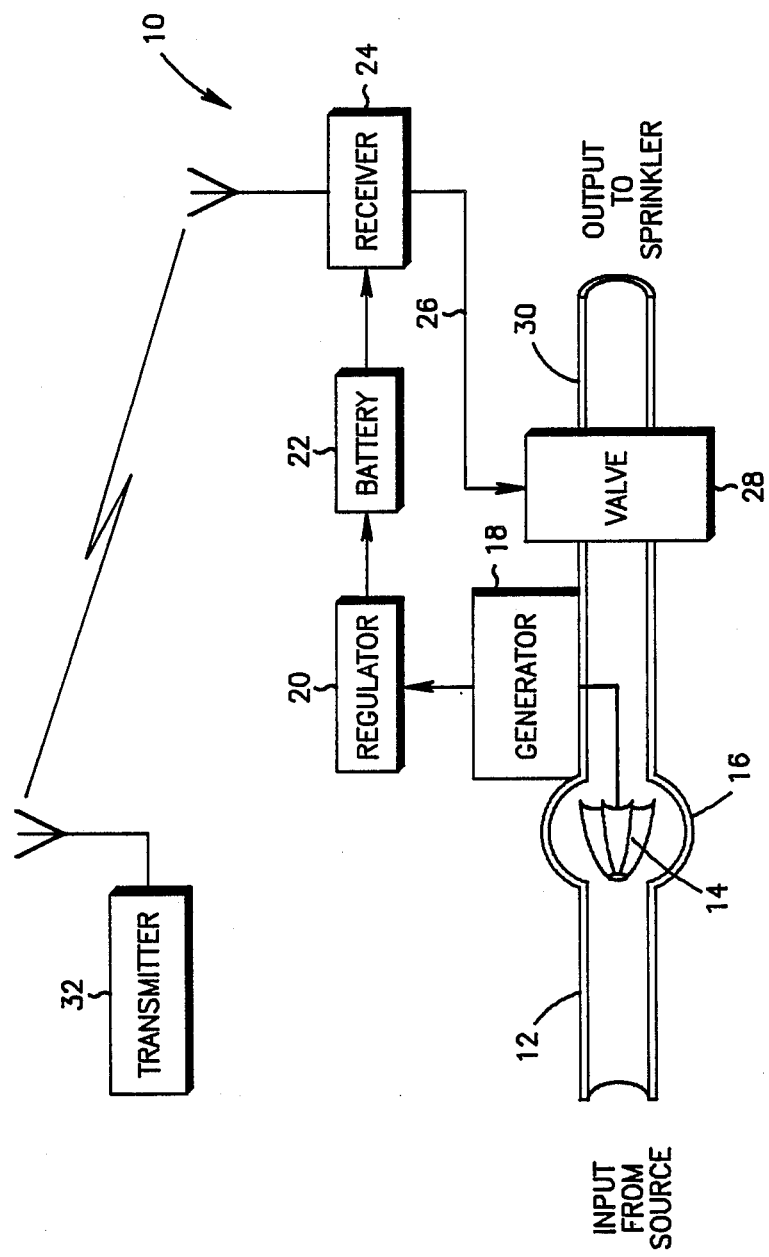

HYDROELECTRICALLY POWERED, REMOTELY CONTROLLED IRRIGATION SYSTEM

TECHNICAL FIELD

This invention relates generally to irrigation systems, and more specifically toward remotely controlled irrigation systems, and is more particularly directed toward a hydroelectrically powered, remotely controlled valve for use in an irrigation system.

BACKGROUND ART

Irrigation systems are widely utilized by golf courses, business parks, and along state highways to maintain the grass and flora in a lush and aesthetically pleasing condition. Agricultural applications of irrigation systems are also well known. Typically, a water distribution system is buried underground, and a plurality of valves facilitate or impede the flow of water to sprinkler heads, which distribute the water in a manner to irrigate a predetermined area.

In a remote control irrigation system, it is known to employ a radio receiver such that the opening or closing of a remote control valve is controlled by transmitting a command code to the radio receiver. However, in conventional remote control irrigation systems this arrangement is both complicated and expensive since electrical wiring (which is required to power the radio receivers) must be distributed underground along with the water distribution network. Typically, this power comprises 110 AC, which must be converted into direct current potentials to power the radio receivers and the remote controlled valves. This leads to a significant increase in the cost of an irrigation system (due to the extra cabling required to distribute the electric power, and the time to install the cabling). For example, a typical 18 hole golf course may require between 1000 and 1500 remote control valves (and radio receivers) to provide proper irrigation. To power these receivers and valves, it is not unusual to require between 50,000 and 75,000 feet of wire (as much as 500,000 feet in large systems), which significantly increases the system cost, its installation, and system operational expenses since additional power must be purchased from an electric utility company.

Accordingly, it is an object of the present invention to provide an improved remote control irrigation system.

It is another object of the present invention to provide a hydroelectrically powered valve for use in a remote control irrigation system.

It is a further object of the present invention provide a hydroelectrically powered, remotely controlled irrigation system.

SUMMARY OF THE INVENTION

Briefly, according to the invention, an impeller is positioned within the flow of a fluid to be used to irrigate an area. The impeller drives a generator, which operates to charge and sustain a storage battery. The battery powers a receiver having an identification code by which the receiver may be addressed to receive commands, such as, for example, to open or close a valve thereby controlling the fluid flow, and thus, the irrigation of an area. By opening the valve, fluid flow is increased, and more power is generated and stored in the battery. In this way, power is generated automatically for the receiver, which, in turn, controls the fluid flow for irrigation.

BRIEF DESCRIPTION OF THE DRAWING FIGURE

The drawing FIGURE illustrates the hydroelectrically powered valve of the present invention communicating with a central transmitter so as to operating within a remote control irrigation system.

DETAILED DESCRIPTION OF THE PREFERRED EMBODIMENT

Referring now to the drawing figure, the hydroelectrically powered remote control valve (10) of the present invention is illustrated. A fluid to be used to irrigate an area is provided from a fluid source (not shown) through an inlet pipe (12). The fluid source may be, for example, a water main of a city or municipality. Alternately, the present invention contemplates that the fluid source may be a deep water well or a private or semi-private reservoir or tank in which a fluid (for example, water) may be stored or combined with a herbicide, insecticide, or fertilizer to provide the fluid to the pipe (12).

Positioned within the pipe (12) is an impeller (14), which spins (or rotates) as the fluid flows from the fluid source through the pipe (12, 30). Alternately, a turbine or "paddle-wheel" may be used in place of the impeller (14). In any event, as the impeller (14) spins, it operates a generator (18), which produces an electric potential or current. Coupled to the generator (18) is a regulator (20), which regulates the current or voltage produced by the generator (18), and may include an AC/DC conversion means. The regulated current or voltage provided by the regulator (20) charges and sustains a storage battery (22), which preferably is a NI-CAD storage battery. The battery (22) powers a receiver (24), which preferably contains an individual and a group address code.

A transmitter (32), transmits command codes either to a particular receiver (valve) by using an individual address code or to several receivers (valves) operating together by transmitting a group address code. These command codes cause the receiver (24) to generate instructions, which are communicated (26) to a controllable valve (28), which preferably comprises any of the solenoid controlled valves currently available from various supplies. Typical instructions may cause the controllable valve (28) to fully open, fully close, or partially open or close thereby controlling the flow of the fluid through the valve and the outlet pipe (30) and on to a sprinkler (not shown) to irrigate a particular area.

In operation, a plurality of the remote control valves (10) would be installed as a distribution network from the fluid source. When the controllable valve (28) is partially or fully opened, the fluid controllable flow causes the impeller (14) to spin, which charges the battery (22). When the valve (28) is closed, the impeller (14) does not spin, but the receiver (24) may operate off the storage battery (22), thereby maintaining communication between the transmitter (32) and the receiver (24). The drain upon the storage battery (22) is not contemplated to be great since the receiver (24) consumes little power; in contrast to the current drain commonly associated with power amplifiers employed in transceivers or transmitters. In this way, no additional electrical wiring is required to power the remote control valves, and the present invention may be easily retrofitted into existing irrigation systems without expensive and laborious wire installation costs.

What is claimed is:

1. A remote control irrigation system, comprising, in combination:
   a fluid source for supplying a fluid to be distributed;
   distribution means, coupled to said fluid source, for distributing said fluid;
   a plurality of remote control valves, coupled to said distribution means, at least one of said plurality of remote control valves comprising:
      generating means for generating an electric potential, wherein said generating means comprises a means capable of rotational operation, in response to said fluid flowing through said distribution means, for operating a generator thereby providing said electric potential,
      storage means for storing said electric potential,
      receiver means, coupled to said storage means, for receiving command codes, and transmitting instruction codes in response thereto;
      means, coupled to said receiver means, for receiving said instruction codes, and for operating a valve in response thereto; and
   means for transmitting said command codes to said receiver means;
   whereby, said at least one of said plurality of remote controlled values may be commanded to facilitate or impede said fluid from flowing through said distribution means.

2. The irrigation system of claim 1, wherein said distribution means has at least a portion thereof expanded to receive said means capable of rotation operation.

3. In a remote control irrigation system having;
   a fluid source for supplying a fluid to be distributed;
   distribution means, coupled to said fluid source, for distributing said fluid; and
   transmitter means for transmitting command codes;
   a remote control valve apparatus comprising, in combination;
      generating means for generating an electric potential, wherein said generating means comprises a means capable of rotational operation, in response to said fluid flowing through said distribution means, for operating a generator thereby providing said electric potential,
      storage means for storing said electric potential,
      receiver means, coupled to said storage means, for receiving said command codes, and transmitting instruction codes in response thereto;
      means, coupled to said receiver means , for receiving said instruction codes, and for operating a valve in response thereto;
   whereby, said remote control value apparatus may be commanded to facilitate or impede said fluid from flowing through said distribution means.

4. A remote control irrigation system, comprising, in combination;
   a fluid source for supplying a fluid to be distributed;
   distribution means, coupled to said fluid source, for distributing said fluid;
   a plurality of remote control valves, coupled to said distribution means, at least one of said plurality of remote control valves comprising:
      generating means for generating an electric current, wherein said generating means comprises a means capable of rotational operation, in response to said fluid flowing through said distribution means, for operating a generator thereby providing said electric potential,
      means for regulating said electric current to provide a regulated electric current;
      storage means, coupled to said regulating means, for storing said regulated electric current;
      receiver means, coupled to said storage means, for receiving command codes, and transmitting instruction codes in response thereto;
      means, coupled to said receiver means, for receiving said instruction codes, and for operating a valve in response thereto; and
   means for transmitting said command codes to said receiver means;
   whereby, said plurality of remote controlled values may be commanded to facilitate or impede said fluid from flowing through said distribution means.

5. The irrigation system of claim 4, wherein said distribution means has at least a portion thereof expanded to receive said means capable of rotation operation.

6. In a remote control irrigation system having;
   a fluid source for supplying a fluid to be distributed;
   distribution means, coupled to said fluid source, for distributing said fluid; and
   transmitter means for transmitting command codes;
   a remote control valve apparatus comprising, in combination;
      generating means for generating an electric current, wherein said generating means comprises a means capable of rotational operation, in response to said fluid flowing through said distribution means, for operating a generator thereby providing said electric potential,
      means for regulating said electric current to provide a regulated electric current;
      storage means, coupled to said regulating means, for storing said regulated electric current;
      receiver means, coupled to said storage means, for receiving said command codes, and transmitting instruction codes in response thereto;
      means, coupled to said receiver means, for receiving said instruction codes, and for operating a valve in response thereto;
   whereby, said remote control value apparatus may be commanded to facilitate or impede said fluid from flowing through said distribution means.

* * * * *